United States Patent [19]

Aoki

[11] Patent Number: 4,882,689

[45] Date of Patent: Nov. 21, 1989

[54] NAVIGATION SYSTEM USING ANGULAR RATE SENSOR

[75] Inventor: Yoshihito Aoki, Shizuoka, Japan

[73] Assignee: Yazaki Corporation, Japan

[21] Appl. No.: 154,028

[22] Filed: Feb. 9, 1988

[30] Foreign Application Priority Data

Feb. 10, 1987 [JP] Japan .................................. 62-27278

[51] Int. Cl.$^4$ ............................................. G06F 15/50
[52] U.S. Cl. .................................. 364/449; 340/988;
340/995; 73/178 R
[58] Field of Search ....................... 364/443, 444, 449;
73/178 R; 342/450, 451; 340/988, 990, 995

[56] References Cited

U.S. PATENT DOCUMENTS

| | | | |
|---|---|---|---|
| 4,763,270 | 8/1988 | Itoh et al. | 340/990 |
| 4,774,671 | 9/1988 | Itoh et al. | 340/988 |
| 4,782,447 | 11/1988 | Ueno et al. | 364/449 |
| 4,792,907 | 12/1988 | Ikeda et al. | 340/990 |
| 4,796,189 | 1/1989 | Nakayama et al. | 340/990 |

Primary Examiner—Gary Chin
Attorney, Agent, or Firm—Wigman & Cohen

[57] ABSTRACT

In a navigation system by which vehicle travel locations are detected by an angular rate sensor and a distance sensor and the detected vehicle travel locations are corrected so as to be displayed along a map road, when a detected vehicle travel angle exceeds a predetermined value under the condition that the vehicle is out of a route judge area set at each branch point, an abnormal travel is detected and alarmed while displaying an abnormal vehicle location. Further, when a travel route change cannot be determined after the vehicle has passed through the set route judge area, an abnormal location is also displayed and alarmed.

4 Claims, 7 Drawing Sheets

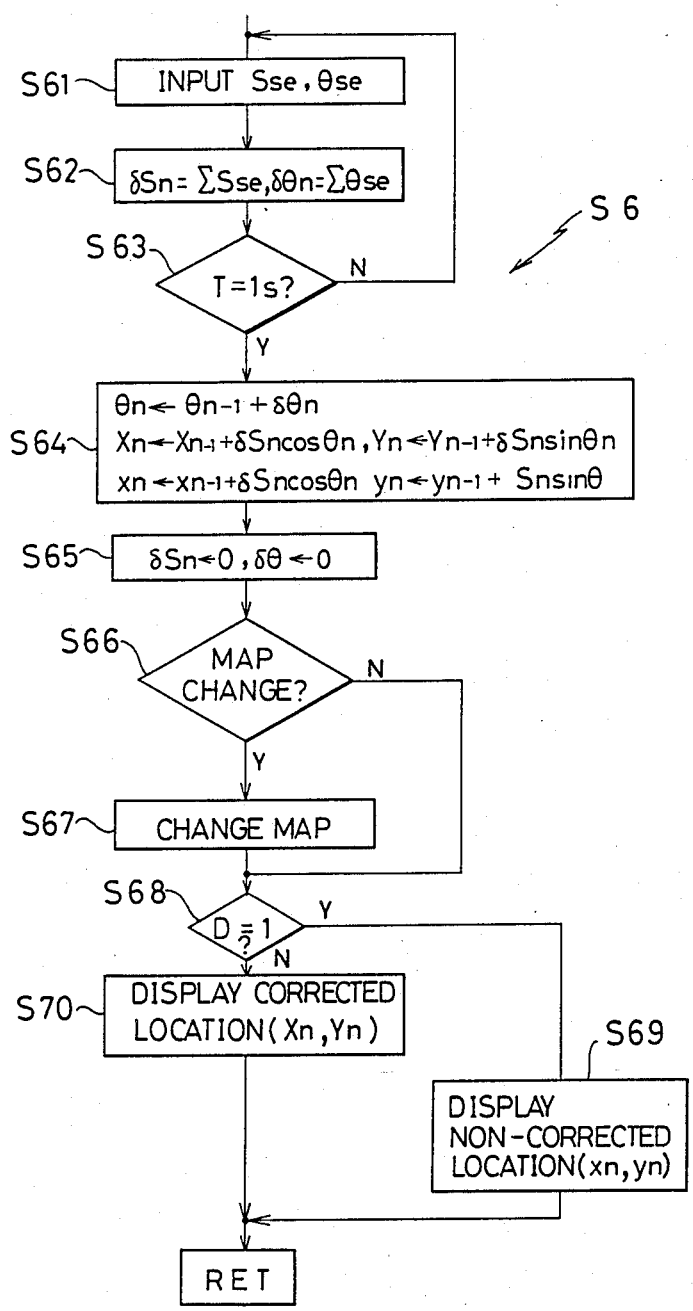

NAVIGATION SYSTEM USING ANGULAR RATE SENSOR

BACKGROUND OF THE INVENTION

1. Field of the Invention

The present invention relates to a navigation system using an angular rate sensor, and more specifically to a navigation system by which automotive vehicle travel locations are detected by an angular rate sensor and a distance sensor and the detected vehicle locations are projected on a displayed road map so that the vehicle travel display moves along a predetermined route on the map.

Since this system can be operative independently without need of other auxiliary means (e.g. radio signals), this system is effective in an urban area or other areas subjected to radio interference where radio navigation systems cannot operate reliably.

2. Description of the Prior Art

The applicant has already proposed a dead reckoning and map correlation system for automotive vehicle tracking, which uses an angular rate sensor and a distance sensor, in Japanese Unexamined Published (Kokai) Patent Application No. 60-48600, entitled vehicle position detecting system. In this system, current vehicle locations can be intermittently detected on the basis of vehicle travel distance data and vehicle travel angle data (detected by an angular rate (velocity) sensor); and the calculated vehicle locations are projected onto roads of a digital map (including intersections and inflections of roads) previously prepared by inputting digital map data to a CPU through a keyboard so that the vehicle travel motion can track a road displayed on the map.

In the prior-art navigation system, a route R is calculated on the basis of map information data including intersections, inflections, and point numbers adjacent to succeeding points all stored in a memory unit, and the current vehicle travel location is displayed along the calculated route R. Further, as shown in FIG. 1, a route judge area JE is formed at each branch point $P_1$ in order to determine a direction along which the vehicle travels. That is to say, a vehicle travel angle is integrated within this route judge area, and the integrated vehicle travel angle is compared with the angles $\theta_2$ and $\theta_3$ of the routes $P_2$ and $P_3$ with respect to a horizontal line X.

Therefore, in the prior-art navigation system, although the vehicle travel locations can be displayed along the route R stored in the memory unit, when the vehicle turns unexpectedly into a gasoline station, for instance, since the vehicle location is still displayed only on the route R obtained by the map, there exists a problem in that the unexpected vehicle travel is displayed as if the vehicle travel in a straight line.

In addition, when the vehicle travel route change is not correctly detected at a branch point, there exists a problem in that vehicle travel locations are not correctly displayed along the route R, and there exists a deviation from an expected route on the map.

SUMMARY OF THE INVENTION

With these problems in mind, therefore, it is the primary object of the present invention to provide a navigation system which can detect such an abnormal vehicle travel deviation from the road map or a travel route change not correctly detected at a branch point in order to produce an alarm signal, and display the detected abnormal condition so that the driver can take appropriate corrective action quickly.

To achieve the above-mentioned object, the navigation system for displaying travel locations of a vehicle according to the present invention comprises: (a) means for detecting vehicle travel angle; (b) means for detecting vehicle travel distance; (c) means, coupled to said vehicle travel angle detecting means and said vehicle travel distrance detecting means, for calculating vehicle locations on the basis of detected vehicle travel angles and distances; (d) means for storing map information data including branch points; (e) means, coupled to said map information data storing means, for setting a route judge area at each branch point to determine a route along which the vehicle travels for a branch point; (f) means, coupled to said vehicle distance detecting means, said map storing means and said route judge area setting means, for determining vehicle passing into the set route judge area when a distance between a current vehicle location and a succeeding branch point becomes shorter than a predetermined value and vehicle passing through the set route judge area when a distance between a position, at which vehicle enters the set route judge area, and a current vehicle location becomes longer than a predetermined value; (g) means, coupled to said vehicle travel angle detecting means and said route judge area pass determining means, for determining travel route at each branch point by comparing a travel angle detected by said travel angle detecting means with map data stored in said map data storing means when the vehicle has passed through the set route judge area; (h) means, coupled to said vehicle location calculating means and said travel route determining means, for correcting calculated vehicle locations so as to be located along a road on a displayed map; (i) means, coupled to said vehicle location correcting means and said route judge area pass determining means, for detecting an abnormal travel when a detected vehicle travel angle exceeds a predetermined value under the condition that said route judge area pass determining means determines that the vehicle is out of the set route judge area; (j) means, coupled to said abnormal travel detecting means, for storing a current vehicle travel location and generating an alarm signal when said abnormal travel detecting means detects an abnormal travel; and (k) means, coupled to said location storing and alarm generating means and said map data storing means, for displaying a map stored in said map data storing means, vehicle locations calculated by said calculating means, the stored vehicle located at which an abnormal travel is detected, and abnormal vehicle locations deviated from a map route.

Further, when the travel route determining means cannot detect a travel route change after the route judge area pass determining means detects that the vehicle has passed through the set route judge area, the location storing and alarm generating means stores the current abnormal location and generates an alarm signal.

Therefore, in the navigation system of the present invention, even if the vehicle drops in at a gasoline station, for instance, since the turning location is stored and alarmed and vehicle locations to and from the gasoline station are displayed by distinguishable dots, the driver can easily restart the normal operation along the map when the vehicle has returned to the predetermined route again.

BRIEF DESCRIPTION OF THE DRAWINGS

The features and advantages of the navigation system using an angular rate sensor according to the present invention will be more clearly appreciated from the following description of the preferred embodiment of the invention taken in conjunction with the accompanying drawings in which like reference numerals designate the same or similar elements or sections throughout the figures thereof and in which:

FIG. 7 is a flowchart showing a subroutine of block $S_6$ shown in FIG. 6(A);

DETAILED DESCRIPTION OF THE PREFERRED EMBODIMENTS

With reference to the attached drawings, a basic configuration of the navigation system using angular rate sensor will be described hereinbelow in more detail.

Figure 3:
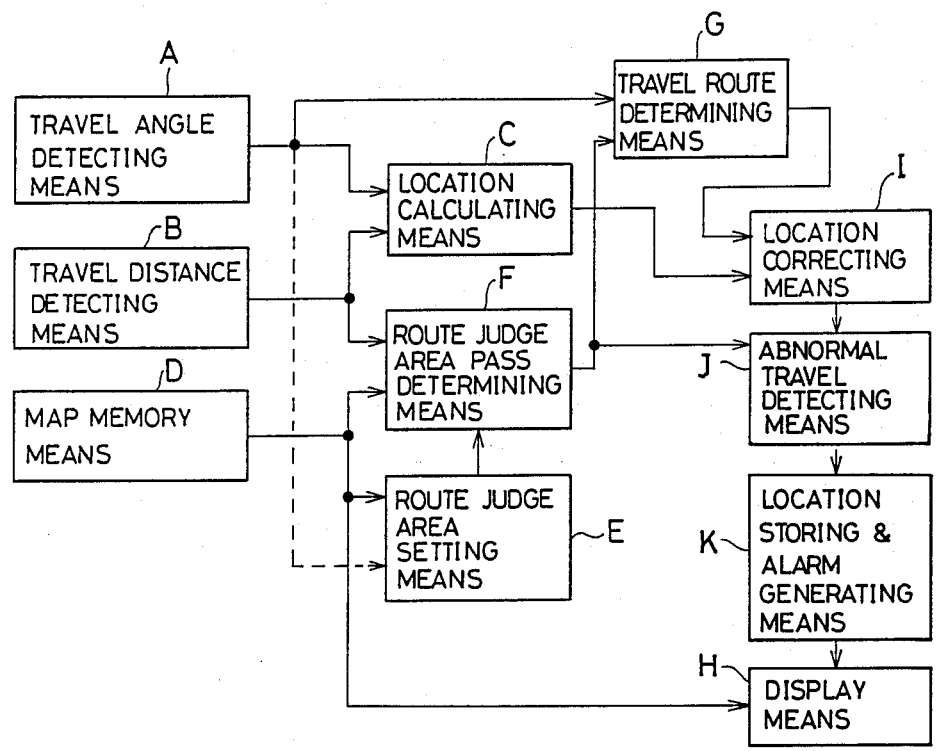
FIG. 3 is a basic block diagram of the navigation system of the present invention.

FIG. 3 shows a schematic block diagram showing a basic configuration of an embodiment of the system according to the present invention. In FIG. 3, the navigation system comprises travel angle detecting means A for detecting a travel angle ($\theta = \int w dt$) of an automotive vehicle on the basis of a signal W from an angular rate sensor; travel distance detecting means B for detecting a travel distance of the vehicle; location calculating means C for calculating a current vehicle location on the basis of the signals from the travel angle detecting means and the travel distance detecting means; map memory means D for storing survey map data including various point coordinates of intersections, branches and inflections of roads; route judge area setting means E for setting a route judge area at each branch point to determine a route along which the vehicle travels at a branch point; route judge area pass determining means F for determining that a vehicle passes into a set route judge area when a distance between a current vehicle location and a succeeding branch point becomes shorter than a predetermined value and that a vehicle passes through the set route judge area when a distance between a position at which vehicle passing into the set route judge area is determined and a current vehicle location becomes longer than a predetermined value; travel route determining means G for determining a vehicle travel route by comparing a travel angle detected by the travel angle detecting means with map data stored in the map data storing means when the vehicle has passed through the set route judge area; location correcting means I for correcting the calculated vehicle location on the judged map route; abnormal travel detecting means J for detecting an abnormal travel when a detected vehicle travel angle exceeds a predetermined value under the condition that the route judge area pass determining means determines that the vehicle is out of the set route judge area; location storing and alarm generating means K for storing a current vehicle travel location and generating an alarm signal when the abnormal travel detecting means detects an abnormal travel; and displaying means H for displaying a map stored in said map data storing means, vehicle locations, stored vehicle location at which an abnormal travel is detected, and abnormal vehicle locations deviated from a map route.

Figure 4:
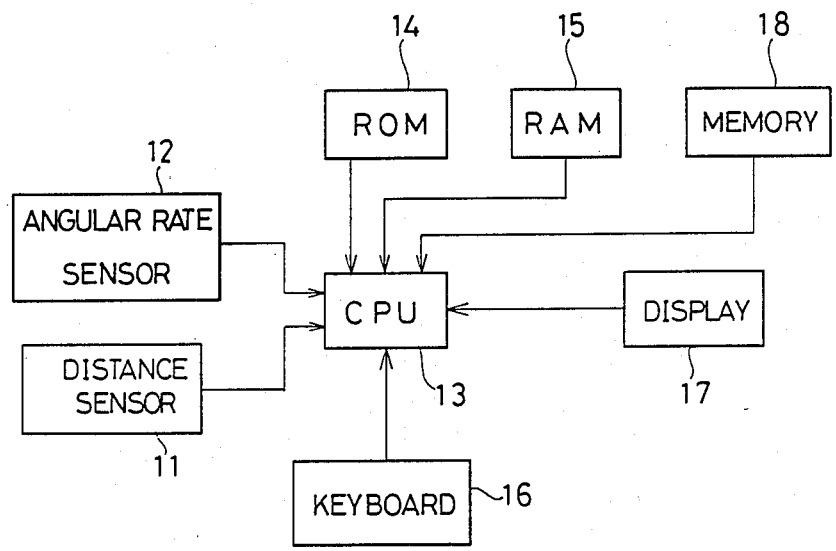
FIG. 4 is an actual block diagram of the navigation system of the present invention.

FIG. 4 shows a block diagram of the system of the present invention. In the drawing, the system comprises a travel distance sensor 11 for generating a signal indicative of the vehicle distance; an angular rate sensor 12 such as a vibrating gyrosensor for detecting vehicle angular velocity; and a CPU 13 for receiving signals outputted from the travel distance sensor 11 and the angular rate sensor 12. The CPU 13 operates in accordance with with programs stored in a ROM 14 to execute various operations by reading various data from the RAM 15 and writing the processed data in the RAM 15. Further, the CPU 13 is connected to a keyboard 16 for entering data, a display unit such as CRT, and a memory 18 for storing survey map information data.

Figure 5:
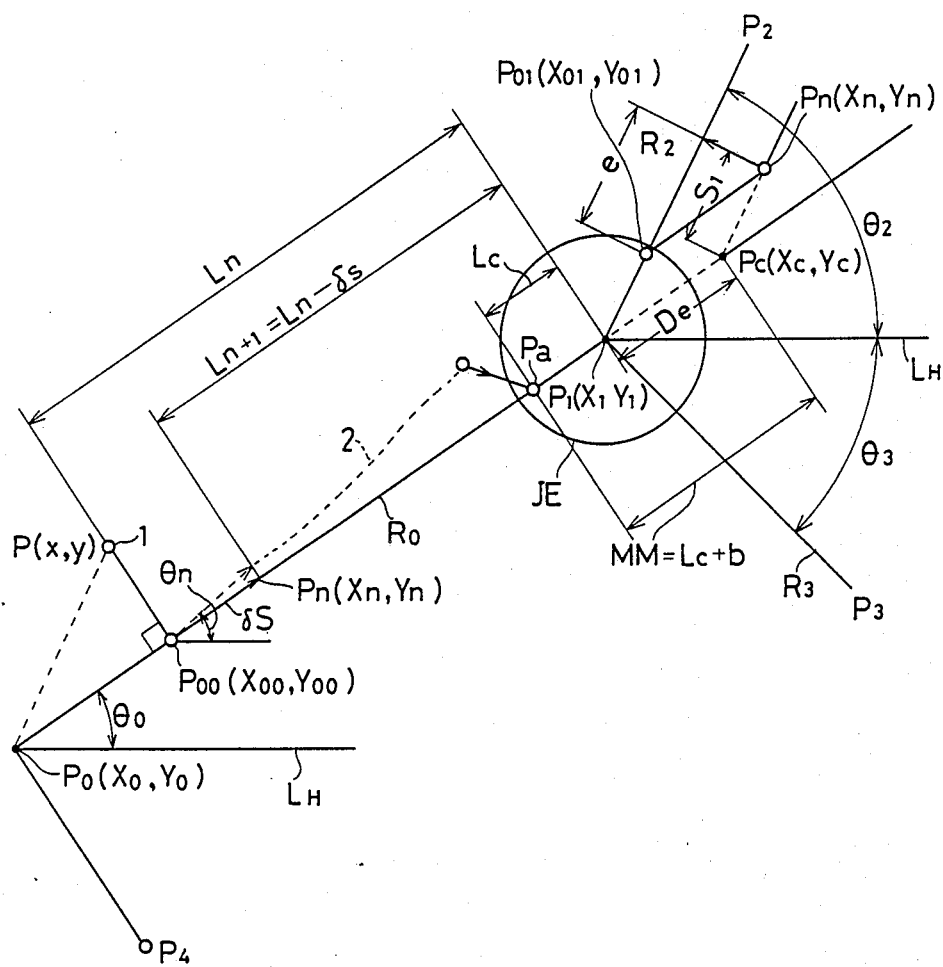
FIG. 5 is a diagram for assistance in explaining the correction operation of the navigation system of the present invention.

FIG. 5 shows a diagram for assistance in explaining the map correction method of the present invention. A point P(x, y) 1 is first initialized to $P_{00}(X_{00}, Y_{00})$. An actual travel route 2 shown by dashed line is calculated by the distance sensor and the angular rate sensor, and compared with map data $R_0$. As a result, vehicle locations are displayed on a map on a CRT screen using symbols. The broken line 2 is a route detected by the sensors and projected to the map route R for correction and this is not displayed on the CRT map. Data for the displayed map are prepared based on a survey map including intersections or inflections of roads (referred to as points and straight lines). The portion between two points is approximate by a straight line. The map is digitally coordinated for each point and stored in the ROM.

In order to remove errors due to the straight line approximate of the map, a certain range referred to as "route judge area JE" is set up at each point at the rate proportional to the distance between two points $P_0$ and $P_1$. In this area JE, judgement of a change in vehicle travel direction and correction of errors are implemented. Within the area judge area, the route or location calculated by the distance sensor and the angular rate sensor is displayed without coordinate correction to the map. However, when the vehicle passes out of the area judge area, the symbol indicating the vehicle location is displayed along the map after correction.

The map data stored in the memory 18 are position data expressed by X-Y coordinates of branch points such as intersections, inflections of roads as shown in FIG. 5 and includes the number of the points and the numbers of other points adjacent thereto.

In more detail, the position data of a route as shown in FIG. 5 are as follows:

| Point No. | X | Y | Adjacent point Nos. |
| --- | --- | --- | --- |
| $P_0$ | $X_0$ | $Y_0$ | $P_1, P_4$ |
| $P_1$ | $X_1$ | $Y_1$ | $P_0, P_1, P_3$ |
| $P_2$ | $X_2$ | $Y_2$ | $P_1$ |
| $P_3$ | $X_3$ | $Y_3$ | $P_1$ |

| Point No. | X | Y | Adjacent point Nos. |
|---|---|---|---|
| . | . | . | . |
| . | . | . | . |
| . | . | . | . |
| $P_n$ | | | |

In the table, the coordinates of the point $P_0$ are $(X_0, Y_0)$ and the adjacent points thereof are $P_1$ and $P_4$. The coordinates of the point $P_1$ are $(X_1, Y_1)$ and the adjacent points thereof are $P_0$, $P_1$ and $P_3$ and so on.

The operation of the system will be explained in accordance with a flowchart shown in FIGS. 6(A), 6(B) and 7 by taking an example where a vehicle travels from a point $P_{00}(X_{00}, Y_{00})$ to a point $P_1(X_1, Y_1)$ along a route $R_0$ connecting two points $P_0(X_0, Y_0)$ and $P_1(X_1, Y_1)$ on a map shown in FIG. 5. Further, in FIG. 5, the dashed lines indicate calculated vehicle route (not displayed).

The initial location $P_{00}(X_{00}, Y_{00})$ and two points $P_0(X_0, Y_0)$ and $P_1(X_1, Y_1)$ along a route $R_0$ are entered through the keyboard 16 and stored in the RAM 15 for initialization (in step $S_1$). The entered current position and map data including roads and place names are displayed (in step $S_2$). In this step $S_2$, the current vehicle location $P(x, y)$ is corrected on the route R.

A gradient $\theta_0$ of the route $R_0$ with respect to a base line $L_H$ (positive in the counterclockwise direction) is calculated on the basis of two points $P_0(X_0, Y_0)$ and $P_1(X_1, Y_2)$ as follows:

$$\theta_0 = \tan^{-1}\left|\frac{Y_0 - Y_1}{X_0 - X_1}\right|$$

In the same way, gradients $\theta_2$ and $\theta_3$ with respect to the base line $L_H$ are calculated on the basis of the two adjacent points $P_1$, $P_2$, and $P_3$ (in step $S_3$).

In the succeeding step, a distance $L_n$ between $P_{00}$ and $P_1$ is calculated as follows (in step $S_4$):

$$L_n = \sqrt{(X_1 - X_{00})^2 + (Y_1 + Y_{00})^2}$$

Thereafter, an area judge value $L_c$ and an area pass judge value MM are determined in order to set a route judge area JE (in step $S_4$).

Thereafter, each data is set (in step $S_5$) as follows:
$\delta S_n$ (sampling distance)=0, $\delta\theta_n=0$,
$X_n=X_{00}$, $Y_n=Y_{00}$, $\theta_n=\theta_0$ Further, the calculated data $\theta_0$, $\theta_2$, $\theta_3$, $L_n$, $\delta S_n=0$, $\delta\theta_n=0$, $X_n=X_{00}$, $Y_n=Y_{00}$ are all stored in the RAM 15 for sampling calculation of each vehicle travel distance $\delta S_n$ and each vehicle travel angle $\delta\theta_n$. (in step $S_5$).

The next sampling calculation (step $S_6$) can be implemented in accordance with a subroutine as shown in FIG. 7.

Each travel distance signal $S_{se}$ from the travel distance sensor 11 and each travel angle signal $\theta_{se}$ ($\int$wdt) from the angular rate sensor 12 are both inputted (in step $S_{61}$).

Further, the obtained travel distance $S_{se}$ and the travel angle $\theta_{se}$ are integrated to obtain $\delta S_n = S_{se}$ and $\delta\theta_n = \theta_{se}$ (in step $S_{62}$), and then CPU check whether a predetermined time (e.g. 1 sec) has elapsed (in step $S_{63}$). If YES, the integrated angle value $\delta\theta_n$ is added to the current angle $\theta_{n-1}$ stored in the RAM 15 to obtain an updated angle value $\theta_n$. The obtained value $\theta_n$ is stored in the RAM 15. On the basis of the current angle value $\theta_n$, the current corrected location $P_n(X_n, Y_n)$ can be obtained as follows (in step $S_{64}$):

$$X_n = X_{n-1} + \delta S_n \cos\theta_n$$

$$Y_n = Y_{n-1} + \delta S_n \sin\theta_n$$

where $P_{n-1}(X_{n-1}, Y_{n-1})$ are coordinates stored in the RAM 15 as the preceding location such as $P_{00}(X_{00}, Y_{00})$. By the above correction, it is possible to correctly track the vehicle travel trace along the road on the map.

In the same way, on the basis of the calculated angle value $\theta_1$, the current non-corrected (sensor-detected) location $P(x_n, y_n)$ can be obtained as follows (in step $S_{64}$):

$$x_n = x_{n-1} + \delta S_n \cos\theta_n$$

$$y_n = y_{n-1} + S_n \sin\theta_n$$

By the above calculation, it is possible to display the current vehicle location as it is without correction on the map.

In the above-mentioned tracking on the map, the tracking display moves $\delta S_n$ by $\delta S_n$ from a designated point $P_{00}$ along a route $R_0$ connecting betwen $P_{00}$ and $P_1$ (in step $S_{64}$). Thereafter, the integrated travel distance $\delta S_n$ and the integrated travel angle $\delta\theta_n$ are reset when the vehicle reaches a route judge area (in step $S_{65}$).

Control checks whether it is necessary to change the map now displayed on the basis of the current location coordinates $P_n(X_n, Y_n)$ and/or $(x_n, y_n)$ (in step $S_{66}$). If YES, the map is changed (in step $S_{67}$). If NO, control skips steps $S_{67}$ to step $S_{68}$. Control checks whether flag. is 1 (in step $S_{68}$). This flag D determines coordinates of the current location to be displayed. If YES (D=1 in step $S_{68}$), the current location is displayed by the non-corrected coordinates $(x_1, y_1)$ based upon the sensors. If NO (D=0 in step $S_{68}$), the current location is displayed by the corrected coordinates $(X_1, Y_1)$ based upon the correcting calculation. That is, the displayed coordinates are determined by this flag D. Thereafter, control returns to step $S_7$ shown in FIG. 6(A).

Returning to FIG. 6(A), CPU checks whether the number of routes selectable at the next point $P_1$ (i.e. the number of branch points) is more than 1 (in step $S_7$). If NO, flag B is set to 1 (in step $S_8$) and proceeds to step $S_9$. With reference to FIG. 6(B), control checks whether the integrated travel distance $\delta S_n$ is zero (in step $S_9$).

Control checks whether $\delta S_n$ is zero (in step $S_9$). If NO, since this indicates that the vehicle is traveling, $L_{n-1} - \delta_n = L_n$ is set (in step $S_{10}$). This indicates to obtain an updated distance $L_{n+1}$ between the point $P_n$ and the succeeding point $P_1$ by subtracting a travel distance increment $\delta S_n$ from the distance $L_n$ between $P_{00}$ and $P_1$ in FIG. 5.

Control checks whether the distance $L_n$ is equal to or smaller than $L_c$ (e.g. 20 m) indicative of route judge area JE (in step $S_{11}$). If NO, since this indicates that $L_n$ is longer than 20 m, control proceeds to the step $S_{12}$. If YES, since this indicates that $L_n$ is shorter than 20 m and the vehicle approaches an intersection, flap E=0 is set (in step $S_{13}$). This flag E is a flag indicative of abnormal travel. When initialized, this flag is E=0. However, when the vehicle deviates abnormally from the map route due to an abnormal travel, this flag is set to E=1.

Then, control sets the travel distance to $L_m=0$ and the flag to $D=1$ (in step $S_{14}$). $L_m$ is a travel distance after the vehicle enters the route judge area and $D=1$ indicates that the vehicle travel distances are displayed by the non-corrected coordinates $(x_n, y_n)$. If NO (in step $S_{11}$), control checks whether flag $E=1$ (in step $S_{12}$). Since E (abnormal travel) is initialized to 0, control proceeds to step $S_{15}$. However, if $E=1$, control proceeds to step $S_{19}$.

Control checks travel angle changes $|\theta_n|$ by sampling travel angle data obtained in step $S_{62}$ of the subroutine shown in FIG. 7 (in step $S_{15}$).

If $|\theta_n| \geq 15$ degree/sec, this indicates that an abnormal travel occurs, because no travel angle change occurs as long as the vehicle travels along a straight line according to a prearranged plan. Control checks whether the warning flag W is 1 (in step $S_{16}$). If $W=1$, since control has already detects an abnormal travel, the warning flag is set to $W=1$ (in step $S_{23}$) and control produces a warning signal and display the current location (in step $S_{24}$), returning to step $S_6$ shown in FIG. 6(A). If $W=0$ (in step $S_{16}$), the abnormal flag is set to $E=1$ and the integrated travel angle is set to $\theta_m=0$ (in step $S_{17}$). Further, the current corrected location, the current non-corrected location, and two point numbers on both sides of the route are stored in a non-volatile memory. Travel angle $\theta_m$ is integrated (in step $S_{19}$) and travel angle change rate $|\theta_n|$ is checked (in step $S_{20}$). The vehicle turning right or left can be determined by checking the angle change rate. For instance, if the angle change rate is less than 2 deg/sec. control determines that the vehicle has been turned. Control checks whether the vehicle travel deviates from the route on the basis of the integrated travel angle $\theta_m$ (in step $S_{21}$). For instance, if $\theta_m$ exceeds 60 degrees, an occurrence of vehicle travel deviation is determined. If YES (in step $S_{21}$), control sets the warning flag to $W=1$ (in step $S_{23}$) and informs the driver of the abnormal travel and displays the current vehicle location stored in step $S_{18}$ (in step $S_{24}$). Therefore, as far as the driver does not correct the operation, the warning flag is not reset, so that warning is kept produced and the non-corrected vehicle locations are displayed being deviated from the map route.

Further, when the vehicle enters a route judge area and this is detected (in step $S_{11}$), the abnormal travel flag is reset ($E=0$) into the initial condition (in step $S_{13}$) when no travel deviation is detected in step $S_{21}$, the abnormal travel flag is reset to $E=0$ into the initial condition (in steps $S_{22}$).

If YES (in step $S_9$), since this indicates that the vehicle is kept stopped, control checks whether the abnormal travel flag is $E=1$ (in step $S_{25}$). If YES, control proceeds to step $S_{21}$; if NO, control proceeds in this step $S_{25}$ to step $S_6$. Further, control proceeds to step $S_6$ when control determines that travel angle change rate is 15 deg/sec or less (in step $S_{15}$) or 2 degree/sec or more (in step $S_{20}$).

Figure 6A:
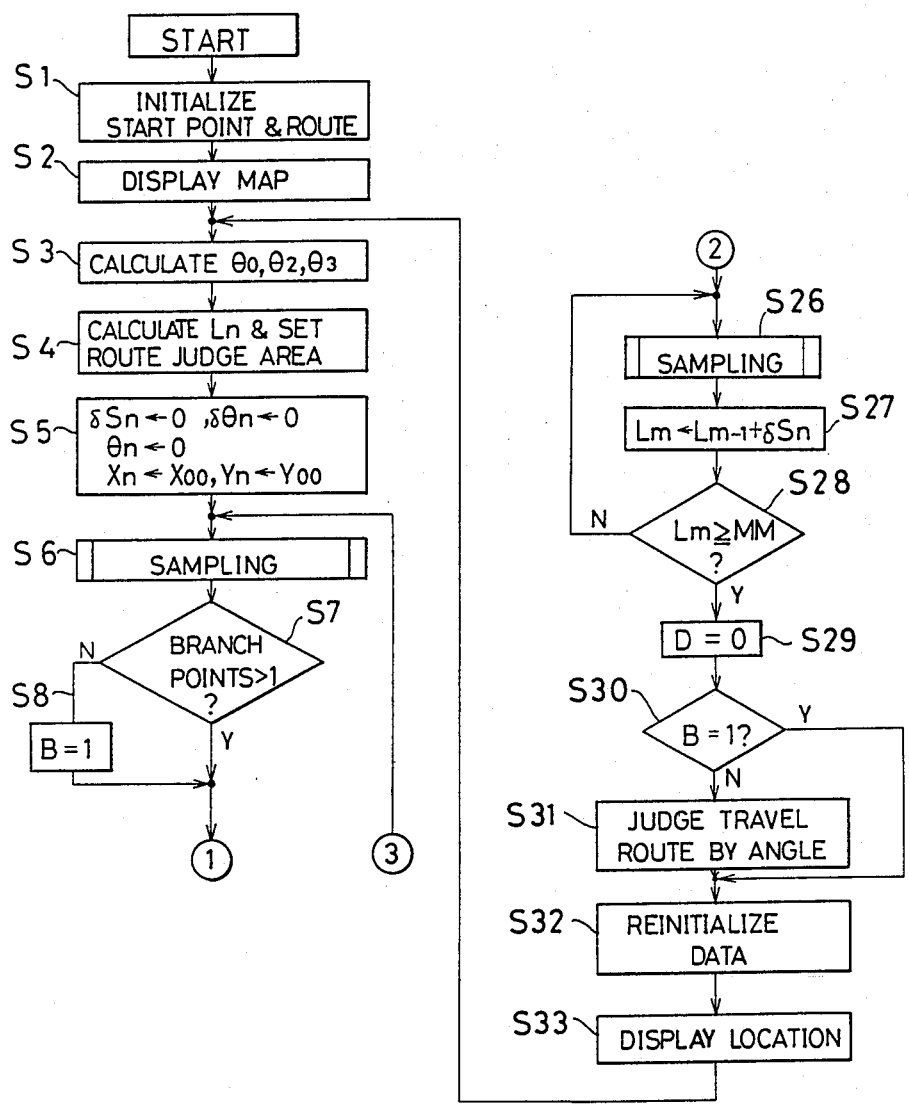
FIGS. 6(A) and (B) are a flowchart for assistance in explaining the operation of the navigation system of the present invention.
Figure 6B:
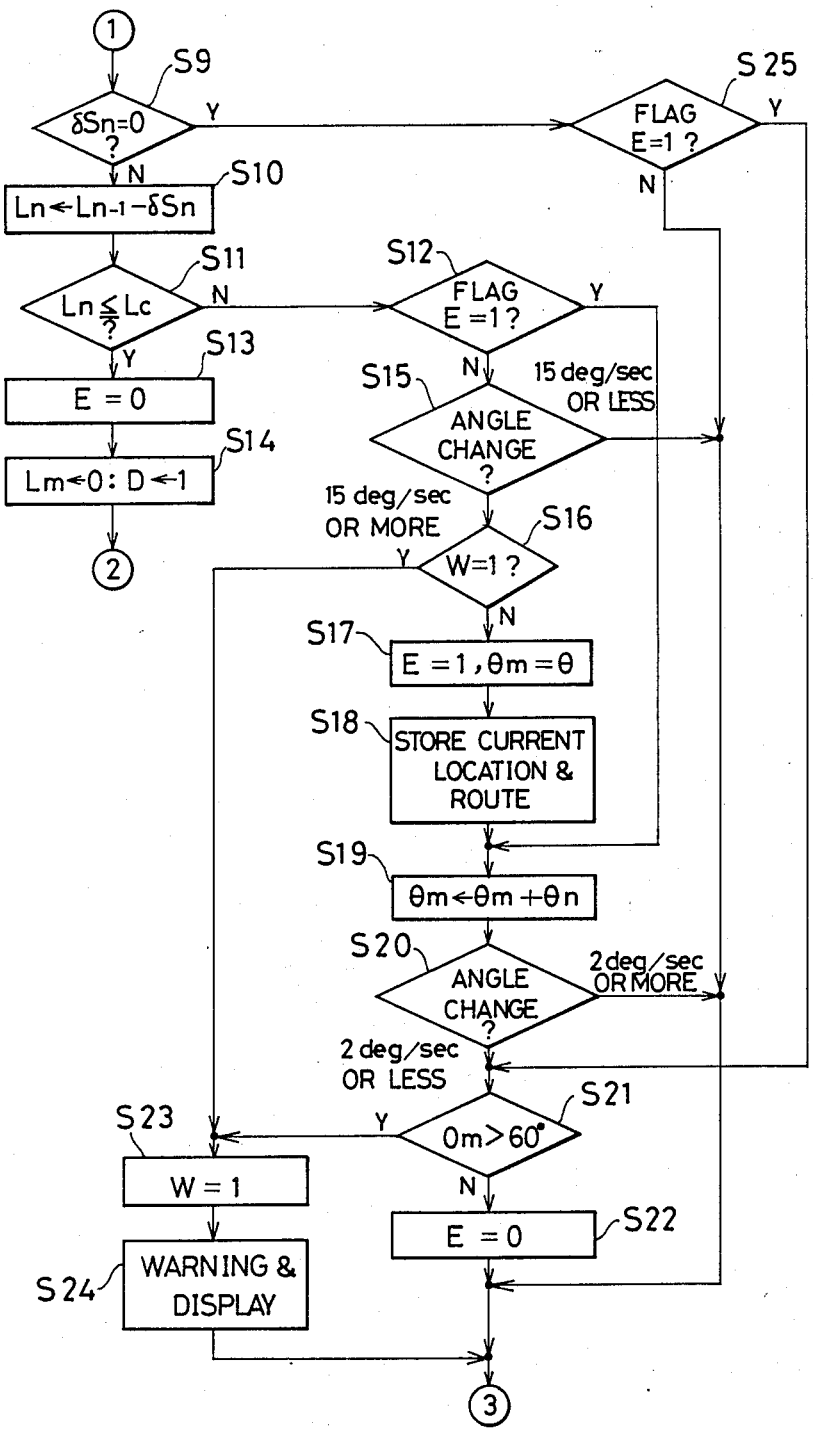

With reference to FIG. 6(A) again, steps $S_{26}$ and after will be described hereinbelow.

Returning to the step $S_{11}$ again, control checks whether the updated distance $L_n$ becomes less than an area judging valve $L_c$ (e.g. 20 m) indicative of the range of the route judge area JE (in step $S_{11}$). If NO, control proceeds to the step $S_{12}$ as described above. If YES, control sets the abnormal flag to $E=0$ (in step $S_{13}$) and proceeds to the succeeding step because this indicates that the vehicle approaches a branch point. Therefore, the $L_m$ (distance between the current point to the branch point $P_1$) is set to zero and the flag D is set to 1 in order to display the current location on the basis of the non-corrected location on the basis of the non-corrected location $(x_n, y_n)$ (in step $S_{14}$). Control proceeds to the step $S_{26}$ (the same as step $S_6$ shown in FIG. 7). In this step $S_{26}$, the sampling calculation starts.

In the succeeding step, control sets $L_{m-1} + \delta S_n = L_m$ (in step $S_{27}$). That is, in FIG. 5, a travel distance $\delta S_n$ is integrated to obtain a distance away from a point $P_a$ where the vehicle enters the route judge area JE. Thereafter, control checks whether $L_m$ exceeds an area pass judge value MM (e.g. 30 m) (in step $S_{28}$). If NO, control returns to the step $S_{26}$ to continuously obtain travel distance $\delta S_n$. If YES, since this indicates that a distance $L_m$ away from a position $P_a$ where the vehicle enters into the route judge area JE exceeds an area pass judge valve MM (e.g. 30 m) at the branch point $P_1$, control determines that the vehicle has passed through the branch point $P_1$.

After control determines that the vehicle has passed through the point $P_1$ as $L_m > MM$ in step $S_{28}$, control proceeds to step $S_{29}$. If $L_m < MM$, control returns to step $S_{26}$ to continue integrating calculation of distance and angle for determining the route area.

Control sets flag D to 0 (in step $S_{29}$) to display the current location on the basis of coordinates $(X_n, Y_n)$ of corrected data, because the location passed out of the area JE.

Control checks whether the flag B is 1 (in step $S_{30}$). If NO ($B \neq 1$), since this indicates that there exists plural branch points, control proceeds to the succeeding step to determine a route along which the vehicle turns (in step $S_{31}$). For doing this, the current vehicle travel angle $\theta_n$ is compared with the angle $\theta_2$ (corresponding to the forward point $P_2$) and the angle $\theta_3$ (corresponding to the forward point $P_3$) both previously obtained in step $S_3$. When the vehicle angle $\theta_n$ is close to the angle $\theta_2$, for instance, it is determined that the vehicle turns along the road $R_2$ (in step $S_{31}$). On the other hand, if YES in step $S_{39}$ ($B=1$), since this indicates that the number of branches is one and therefore it is unnecessary to determine the route (in step $S_{31}$), and control directly proceeds to the succeeding step $S_{32}$.

Control reinitializes the current vehicle location and determines an updated initial location $P_{01}(X_{01}, Y_{01})$ (in step $S_{32}$). The updated initial location $P_{01}$ is displayed (in step $S_{23}$). Thereafter, control returns to step $S_3$.

The distance $S_1$ between $P_c(X_c, Y_c)$ and $P_n(X_n, Y_n)$ is calculated, and then the initialized vehicle location $P_{01}(X_{01}, Y_{01})$ can be calculated as $$S_1 = \sqrt{(X_c - X_n)^2 + (Y_c + Y_n)^2}$$
$$X_{01} = X_1 + S_1 \cos\theta_2$$
$$Y_{01} = Y_1 + S_1 \sin\theta_2$$

The above initialized location $P_{01}(X_{01}, Y_{01})$ is determined as a new location $P_{00}(X_{00}, Y_{00})$ for the succeeding tracking operation.

Thereafter, control returns from the step $S_{33}$ to the step $S_3$ to repeat the similar tracking operation. In this case, the point $P_1$ is regarded as the point $P_0$; the point $P_2$ is regarded as the point $P_1$; the route $R_0$ is regarded as the route $R_2$ in the succeeding tracking operation.

Figure 1:
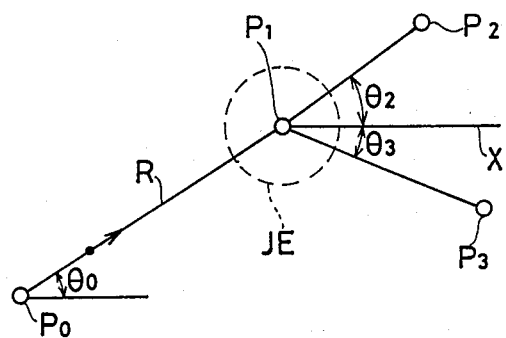
FIG. 1 is a diagram for assistance in explaining problems involved in the prior-art navigation system.
Figure 2A:
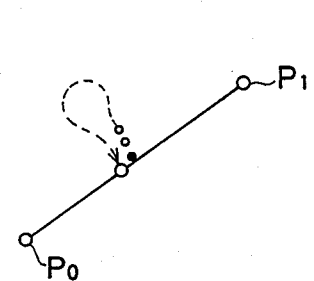
FIGS. 2(A) and (B) are diagrams for assistance in explaining display operations of the navigation system of the present invention.

In the above-mentioned system, when a vehicle traveling from a point $P_0$ to a point $P_1$ turns to the left to drop in at a gasoline station, for instance, as shown in FIG. 2(A), a warning is produced and the left-turn location is automatically displayed on the map by a black dot. Further, thereafter, the vehicle travel locations are displayed on the map as shown by white dots along the dashed line. Therefore, when the vehicle returns back to and starts again along the map route, the driver can easily determine a restart position on the map route.

Figure 2B:
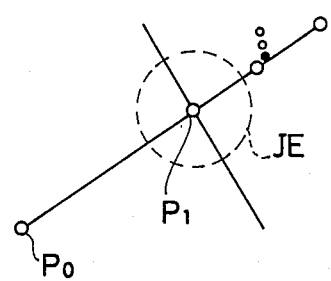

Further, when no left-turn signal is produced after the vehicle has passed through the route judge area JE of a point $P_1$ in FIG. 2(B), since a large travel angle change is detected and a warning is produced, the drive can know an erroneous display at early stage, and therefore he can make an appropriate location correction without lasting sight of the vehicle travel location.

As described above, in the navigation system of the present invention, when the vehicle turns unexpectedly to the left or right at positions of a straight road, since a warning is produced; the travel angle is monitored; and the turning point is stored, the driver can easily initialize the restart point when the vehicle returns to the map route.

Further, when vehicle turning angle data are not read within a route judge area due to a difference in distance between a route judge area on the map and an actual travel location, route judgement error is immediately warned to the driver, the driver can find the route judgement error in its early stages, and therefore take an appropriate action.

What is claimed is:

1. A navigation system for displaying travel locations of a vehicle on a displayed map, comprising:
   (a) means for detecting vehicle travel angle;
   (b) means for detecting vehicle travel distance;
   (c) means coupled to said vehicle travel angle detecting means and said vehicle travel distance detecting means for calculating vehicle locations on the basis of the detected vehicle travel angles and distances;
   (d) means for storing map information data including branch points;
   (e) means coupled to said map information data storing means for setting a route judge area at each branch point to determine a route along which the vehicle travels from a branch point;
   (f) means coupled to said vehicle distance detecting means said map storing means and said route judge area setting means, for determining vehicle passing into the set route judge area (JE) when a distance (Lc) between a current vehicle location (Pa) and a succeeding branch Point ($P_1$) becomes shorter than a first predetermined distance and vehicle passing through the set route judge area when a distance (MM) between a position (Pa), at which vehicle enters the set route judge area, and a current vehicle location (Pc) becomes longer than a second predetermined distance;
   (g) means coupled to said vehicle travel angle detecting means and said route judge area pass determining means for determining a travel route at each branch point by comparing a travel angle detected by said travel angle detecting means with map data stored in said map data storing means when the vehicle has passed through the set route judge area;
   (h) means coupled to said vehicle location calculating means and said travel route determining means, for correcting said calculated vehicle locations (Pn) so as to be located along a road on a displayed map in accordance with expressions;
   (i) means coupled to said vehicle location correcting means and said route judge area pass determining means for detecting an abnormal travel when a detected vehicle travel angle exceeds a predetermined angle under the condition that said route judge area pass determining means determines that the vehicle is out of the set route judge area;
   (j) means coupled to said abnormal travel detecting means for storing a current vehicle travel location and generating an alarm signal when said abnormal travel detecting means detects said abnormal travel; and
   (k) means coupled to said location storing and alarm generating means and said map data storing means for displaying a map stored in said map information data storing means, vehicle locations calculated by said calculating means and corrected by said location correcting means, the stored vehicle located at which the abnormal travel is detected and abnormal vehicle locations deviated from a map route.

2. The navigation system as set forth in claim 1, wherein when said travel route determining means cannot detect a travel route change after said route judge area pass determining means detects that the vehicle has passed through the set route judge area, said location storing and alarm generating means stores a current abnormal location and generates said alarm signal.

3. A method of displaying travel locations of a vehicle along a displayed map, which comprises the following steps of:
   (a) detecting vehicle travel angles;
   (b) detecting vehicle travel distances;
   (c) calculating vehicle locations on the basis of said detected vehicle travel angles and distances;
   (d) storing map information data including branch points;
   (e) setting a route judge area at each branch point to determine a route along which the vehicle travels from a branch point;
   (f) determining vehicle passing into the set route judge area on the basis of a distance between a current vehicle location and a succeeding branch point and vehicle passing through the set route judge area on the basis of a travel distance from a position at which the vehicle enters the route judge area and said current vehicle location;
   (g) determining a travel route by comparing a detected travel angle with the stored map data when the vehicle has passed through the set route judge area;
   (h) correcting said calculating vehicle locations so as to be located along a road on a displayed map in accordance with expressions;
   (i) detecting an abnormal travel when a detected vehicle travel angle exceeds a predetermined angle under the condition that the vehicle is out of the set route judge area;
   (j) storing a current vehicle travel location, and generating an alarm signal when said abnormal travel is detected; and
   (k) displaying a stored map, the calculated and corrected vehicle locations, a detected abnormal travel location, and abnormal vehicle locations deviated from a map route simultaneously.

4. The method of displaying travel locations of a vehicle as set forth in claim 3, which further comprises the following steps of: storing a current abnormal location and generating an abnormal signal when a travel route change cannot be detected after the vehicle has passed through the set route judge area.

* * * * *

UNITED STATES PATENT AND TRADEMARK OFFICE
CERTIFICATE OF CORRECTION

PATENT NO. : 4,882,689
DATED : November 21, 1989
INVENTOR(S) : YOSHIHITO AOKI

It is certified that error appears in the above-identified patent and that said Letters Patent is hereby corrected as shown below:

IN THE SPECIFICATION:

Column 1, line 55, "travel" should read --travels--.
Column 2, line 15, "for" should read --from--;
          line 50, "located" should read --location--.
Column 4, line 20, delete "with" (second occurrence);
          line 44, "approximate" should read --approximation--.
Column 5, line 63, "check" should read --checks--.
Column 6, line 48, after "step $S_9$." insert --If YES, CPU directly proceeds to step $S_9$.--
Column 7, line 18, "detects" should read --detected--;
          line 20, "display" should read --displays--.
Column 8, lines 4-5, delete "on the basis of the non-corrected location" (second occurrence).
Column 9, line 13, "drive" should read --driver--;
          line 16, "lasting" should read --losing--.

UNITED STATES PATENT AND TRADEMARK OFFICE
CERTIFICATE OF CORRECTION

PATENT NO. : 4,882,689

DATED : November 21, 1989

INVENTOR(S) : YOSHIHITO AOKI

It is certified that error appears in the above-identified patent and that said Letters Patent is hereby corrected as shown below:

IN THE CLAIMS:

Column 10, Claim 1, line 17, "located" should read --location--;

line 49, "calculating" should read --calculated--.

Signed and Sealed this

Twenty-second Day of January, 1991

Attest:

HARRY F. MANBECK, JR.

*Attesting Officer*  *Commissioner of Patents and Trademarks*